J. J. LEHAYE.
Churn.
No. 25,162.
Patented Aug. 16, 1859.
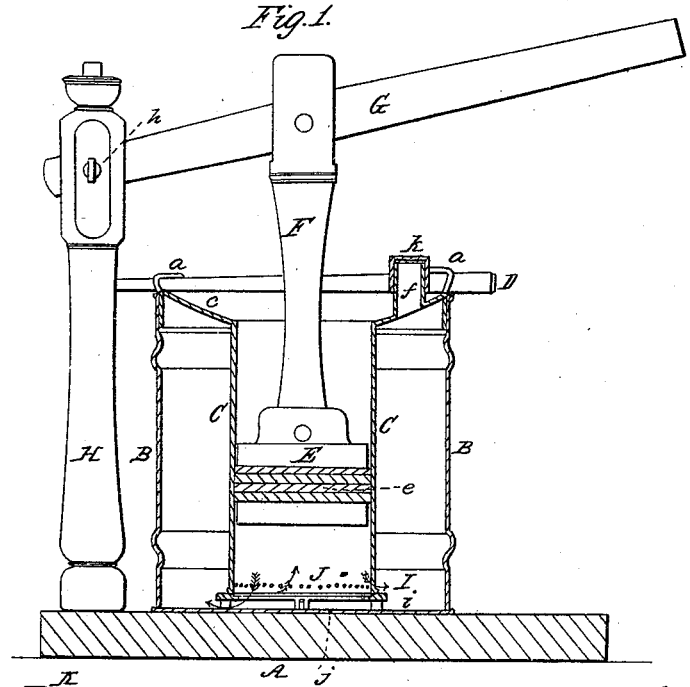
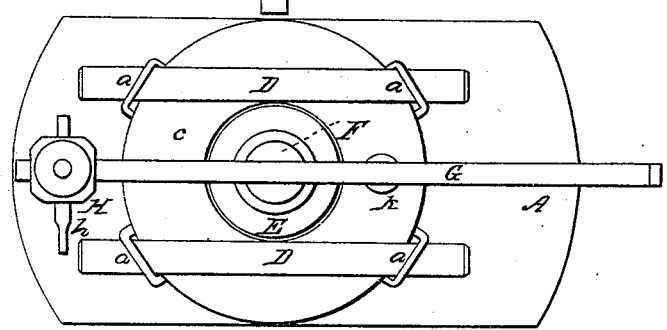
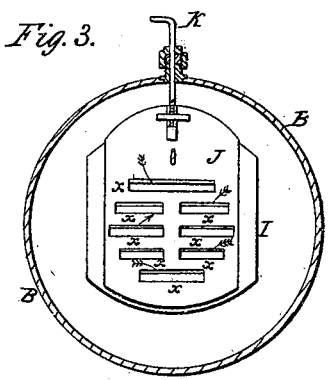
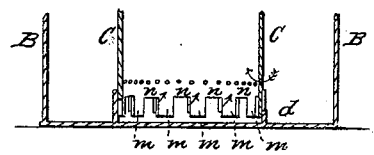
Witnesses:
Henry Howson
Horace See
Inventor:
John Jno Lehaye

UNITED STATES PATENT OFFICE.

JOHN J. LEHAYE, OF READING, PENNSYLVANIA, ASSIGNOR TO HIMSELF, AND JOHN TUCKER, OF PHILADELPHIA, PENNSYLVANIA.

CHURN.

Specification of Letters Patent No. 25,162, dated August 16, 1859.

*To all whom it may concern:*

Be it known that I, JOHN J. LEHAYE, of Reading, Berks county, Pennsylvania, have invented a new and Improved Apparatus for Churning and other Purposes; and I do hereby declare the following to be a full, clear, and exact description of the same, reference being had to the accompanying drawing and to the letters of reference marked thereon.

My invention consists in a vessel for containing the cream and a hollow cylinder inside this vessel, with a reciprocating plunger, in combination with certain adjustable openings described hereafter, the movement of the plunger causing the cream to pass from the vessel into the cylinder and back again through the said openings which can be contracted during the operation thereby subjecting the cream to such a friction and so agitating it that its unctuous particles are more readily separated from the whey than by the usual process of agitating the cream by means of ordinary dashers or atmospheric pressure.

In order to enable others to make and use my invention, I will now proceed to describe its construction and operation.

On reference to the accompanying drawing which forms a part of this specification, Figure 1, is a sectional elevation of my improved churn. Fig. 2, a plan view. Fig. 3, a sectional plan. Fig. 4, a modified arrangement of part of the apparatus.

Similar letters refer to similar parts throughout the several views.

A, is the foundation or base of the apparatus to which the vessel B, is permanently secured. Within this vessel and concentric therewith is situated the hollow cylinder C, which has a flanche c, on the top, fitting within, and resting on the upper edge of the vessel B. To the latter are secured staples a, a, for receiving the wedged shaped strips D, for retaining the flanche c, of the cylinder B, in close and firm contact with the outer vessel.

E, is a packed plunger fitting snugly but so as to move freely within the cylinder, a projection on this plunger being jointed to the lower end of the rod F, and the upper end of the latter being connected to the arm G, which has its fulcrum on a pin h passing through the top of the column H on the base A.

On the bottom of the vessel B rests a plate I with oblong openings, and on the top of the latter a grated plate J with similar openings, the lower plate I, being supported on legs i so as to be a short distance above the bottom of the vessel. A projection j, from the latter fits into a projection on the under side of the plate, which is thus retained in its proper position.

The plate J is guided by flanges on the plate I, and is controlled by a rod K, the screwed end of which is adapted to a nut let into the surface of the plate so that on turning the rod K (which passes through a stuffing box on the side of the vessel B) the plate J may be slid backward and forward on the plate I, at pleasure.

The oblong openings x of one plate are of the same length, of about the same width, and the same distance apart as those of the other plates.

The cylinder C, is of such a length that when it is secured to its place within the vessel, its lower edge shall be in contact with, but not bear heavily on the plates J, and I.

The cream being placed within the vessel A, the plate J is so adjusted on the plate I, that the holes in one shall coincide, or nearly so, with those in the other plate. A reciprocating motion is then imparted to the plunger E, by means of the arm G. As the plunger rises, the cream will rush from the vessel B, through the openings of the plates I, and J, into the interior of the cylinder, and when the plunger is depressed the cream will return to the vessel B through the same openings.

The usual mode of producing butter in churns is by the simple agitation of the cream by the aid of dashers or by atmospheric pressure. Although the unctuous particles of the cream may be readily separated from the whey by this agitation, the most ready means of effecting this object is by friction. By causing the cream to pass and repass through contracted openings, and with considerable force, the friction of the cream against the edges of the openings has the effect of rapidly separating the butter from the whey at the same time the constant change in the course of the cream agitates the latter as effectually as the ordinary dashers. During the first part of the operation the plate J, is so adjusted that the whole width of the openings in the lower plate I are exposed, and as the process is continued the openings in the lower plates are contracted by turning the rod K and thereby moving the plate J, until the openings in the plate I are partially covered. The friction imparted to the cream will thus be increased as the openings are contracted.

Another arrangement of adjustable openings is shown in Fig. 4, where the bottom of the cylinder c fits inside an annular projection d on the bottom of the vessel B, a series of projections m being formed on the bottom of the cylinder and a similar set of projections on the annular flange d, so that by turning the cylinder partially around, its projection m may be made to cover a greater or lesser portion of the spaces between the projections n, thereby increasing or diminishing the openings for the passage of the cream with precisely the same result as that obtained by the grated plates I and J.

A tube F is secured to the flanch c and furnished with a cover k, on the removal of which the gases generated during the process of churning may escape and a supply of fresh air allowed to enter the vessel.

The above described apparatus may be used with good effect as a substitute for an egg beater and for mixing curds ready for the market.

I claim as my invention and desire to secure by Letters Patent—

The vessel B, cylinder C, and reciprocating plunger E, adapted to, and arranged in respect to each other substantially as herein set forth in combination with the devices herein described or their equivalents, for enlarging or contracting at pleasure the communication between the said cylinder and vessel for the purpose specified.

In testimony whereof, I have signed my name to this specification in the presence of two subscribing witnesses.

JOHN JOS. LEHAYE.

Witnesses:
   HENRY HOWSON,
   CHARLES D. FREEMAN.